Patented Nov. 11, 1941

2,261,964

UNITED STATES PATENT OFFICE 2,261,964

COMPOSITE COATED SHEET MATERIAL

William R. Collings, Midland, Mich., assignor to The Dow Chemical Company, Midland, Mich., a corporation of Michigan No Drawing. Application September 5, 1939, Serial No. 293,432

11 Claims. (Cl. 91—70)

This invention relates to paper bearing a composite coating which provides the paper with a water- and moisture-proof surface of high gloss and more than the ordinary apparent optical depth.

Many attempts have been made to provide moisture-proof wrapping paper and similar fibrous sheet material, suitable for employment in wrapping or packaging food products and the like. One of the problems to be overcome by a material for this purpose is that of providing the necessary flexibility, moisture-proofness, and heat-sealing properties by means of a high gloss coating which will not curl the paper or distort the appearance of printing which is applied to the paper prior to coating. Among the methods which have been employed, in an attempt to solve this problem, the commonest has been one involving lacquering of the fibrous sheet. There are several disadvantages inherent in a lacquer-coated wrapping sheet. A practical disadvantage of the use of lacquers for coating paper, is that, due to absorption of solids into the paper from the low viscosity lacquer solution, the film is non-glossy, and a film thickness corresponding to 2 or 3 coatings is required to provide an attractive surface. Lacquer coatings alone have no outstanding apparent optical depth relative to coating thickness, and are, in addition, deficient in their moisture-proofing properties. If a lacquer solution has a high resin content, and high total solids content, together with a low solution viscosity suitable for roller coating, it will deposit glossy but brittle coatings on paper. Flexible lacquer coatings have only been produced from medium-to-high viscosity solutions of low solids content, and several applications are needed to provide the flexible coat of desired gloss, since here again the solids are absorbed into the porous paper.

Another method that has been employed, and which contributes a certain amount of gloss but which is deficient in the required flexibility, involves the application to a fibrous sheet of a "hot melt" composition which may comprise resinous and/or waxy materials.

Yet another method of coating paper heretofore proposed involves applying to the paper a "stop coat" comprising a sizing material or a cellulose derivative and spreading thereover a moisture-resistant composition comprising a waxy body, a resinous body, or both. The inherent disadvantage of this method is that the overcoat of waxy or resinous nature does not bond firmly to the stop coat, and does not provide the required flexibility. It fails ultimately in its moisture- or water-proofness, due, in the main, to surface fractures in the moisture-proofing overcoat.

Paper has been coated by bonding thereto, by means of an adhesive, a transparent glossy foil of regenerated cellulose or of cellulose ethers or esters. Such a method, if employed to coat a printed paper, will be found to give two light reflecting surfaces above the paper, and hence to lead to distortion of the printing, and at some angles the printing is obliterated apparently by the reflected rays. The presence of a layer of adhesive between the foil and the paper has often caused papers of this kind to have a blotchy appearance. It sometimes happens that the adhesive fails when foil coated papers are flexed around a short radius of curvature, and the foil separates from the paper. While attractive papers can be prepared by bonding foils to paper, it has not been practical according to present-day practice to make free foils thinner than about 0.00088 inch. Films of this dimension or thicker greatly add to the cost of coated paper. Thinner films, whose material cost is within an acceptable range, have not been commercially practical, as above indicated, and this would remain true for paper laminating, even if such films could be made easily, since very thin films are not strong enough to withstand coating operations followed by the stresses and pressures used in bonding operations.

Regardless of the method which has been employed, it has not proven possible heretofore to produce a coated paper article having a thin coating which is moisture-proof and non-tacky and non-blocking up to 50° C. while exhibiting flexibility at temperatures of 0° C. or lower. For a coated paper to be employed in wrapping service, these properties are much to be desired. The coating must, of course, be free of haze and exhibit a high gloss to be acceptable in many fields of application. The term "non-blocking" used herein refers to a coating which does not stick to other sheets when several coated sheets are stacked together and a weight of one pound is applied over an area an inch square.

It is accordingly among the objects of the invention to provide paper suitable for wrapping or packaging purposes bearing a high gloss coating of great apparent optical depth relative to actual coating thickness, the coated article being moisture- and water-resistant, flexible at low temperatures, non-tacky and non-blocking at practical service temperatures up to 50° C. and easily heat sealable to other fibrous sheets. Related objects will become apparent from the following detailed description of the invention.

The term "wrapping paper" is herein used to designate a paper of sufficient flexibility and strength to be used for wrapping or packaging purposes, without regard to the actual use to which the paper is put.

According to the present invention, the disadvantages inherent in the prior art processes of coating paper may be overcome and an improved article may be produced having the aforesaid desired characteristics by first casting a thin film of a plasticized medium or high viscosity type of water-insoluble cellulose ether from viscous solution onto the surface of the paper sheet, the said film being of a thickness less than 0.001 inch (1 mil), and preferably of a thickness of about 0.5 mil, more or less. The second step in the coating operation is to apply to the film-bearing paper sheet a thin coating of a "hot melt" composition comprising a minor proportion of a water-insoluble cellulose ether and major proportions of waxes, resins, or both. The nature of the melt coating will be described more fully hereinafter. This coating will always have one constituent in common with the base coat which was deposited from organic solvent solutiton and a second blending constituent may be present either in the melt coating or in the base coat. Thus, the melt coat which is of heat sealing character will blend at least at the common surface with the base coat and become permanently affixed thereto. The total thickness of the successive coats applied to the fibrous sheet may be and generally is less than the customary thicknesses of cellulose derivative films which are bonded to paper for decorative purposes. The thickness of the melt coating is generally less than 0.5 mil, and preferably about 0.3 mil, so that the total thickness of base and melt coats applied according to the invention is preferably less than 1 mil, and is always less than 1.5 mils.

The base coat which is applied to the paper from viscous solution in volatile organic solvents is a plasticized cellulose ether containing a softening plasticizer in amount sufficient to impart to the film a hardness index preferably from 50 to 75. The term "hardness index" is herein defined as the hardness of a plasticized cellulose derivative film compared with that of an unplasticized film of the same cellulose derivative taken as 100. Plasticizers suitable for the purpose include the alkyl-phenyl phosphates, the diphenyl phosphates, or the cyclohexyl-phenyl phosphates and when these are employed, from 15 to 35 per cent thereof is generally incorporated in the cellulose ether to provide the desired hardness index. When the hardness index is in the stated range, the film exhibits a minimum curling effect when deposited on paper. The solutions from which the cellulose ether films are deposited on the paper are preferably those having viscosities suitably in the range from 300 to 500 seconds as determined in the falling ball apparatus described in A. S. T. M. D–301–33. Any volatile solvent for the cellulose ether may be employed provided that on evaporation a non-blushing film is deposited on the paper. Suitable methods of coating paper for the present purpose have been described by the present inventor and others in co-pending applications, Serial Nos. 286,160, 286,161 and 286,076, filed July 24, 1939. Other methods of coating paper with cellulose derivative solutions are known to those skilled in the art and, if such methods are capable of depositing continuous films of a thickness in the preferred range below 0.001 inch, they may be employed to provide the base coat for the herein described articles.

The cellulose ethers have the greatest inherent flexibility of any of the cellulose derivatives and when cast into films of hardness index in the aforesaid range provide non-tacky coatings which are non-blocking at temperatures up to about 50° C. or higher and which are extremely flexible at temperatures below 0° C.

The melt coating applied over the base coat provides the desired heat sealing characteristics to the article as well as giving it the needed gloss, moisture- and water-resistance and the attractive surface of great optical depth relative to actual coating thickness. The preferred melt composition will contain a small amount of a water-insoluble cellulose ether and major amounts of waxes and resins. Suitable melt coatings for the purpose have been described by Kauppi and Kropscott in co-pending application Serial No. 198,832, filed March 30, 1938, and in their application Serial No. 273,965, filed May 16, 1939. The preferred melt compositions comprise a water-insoluble cellulose lower alkyl ether, i. e. one wherein the alkyl groups contain from 2 to 5 carbon atoms—5 to 20 per cent; an ester wax—from 25 to 80 per cent; a compatible non-oxidizing, non-setting resin—less than 40 per cent; a mineral wax—from 5 to 30 per cent; and a compatible plasticizer—less than 20 per cent; the total amount of the named ingredients equaling 100 per cent of the melt, the resin or the plasticizer being optionally omitted ingredients. The melt employed is capable of dissolving more cellulose ether than it originally contains, and hence dissolves part of the surface of the cellulose ether film on which it is deposited, causing the two layers to bond one to the other.

For purposes of the present description, the term "ester wax" comprises materials from any of the following groups: (a) the true waxes, i. e. the esters of high molecular weight monohydric alcohols and higher fatty acids, examples of which are spermaceti, carnauba, montan, beeswax, Japan wax, Chinese insect wax, etc.; (b) synthetic esters of polyhydric alcohols with the higher fatty acids, e. g. 12-hydroxy stearin, glycol stearate, diethylene glycol laurate, etc; (c) high melting point fats, such as tallow (ordinarily used in conjunction with one of the other types); (d) synthetic esters of monohydric alcohols with the higher fatty acids, e. g. phenoxy ethyl stearate, lauryloxyethyl laurate, palmitic and stearic esters of the alcohols obtained by reducing palm or sperm oil fatty acids; (e) monohydric alcohols from the hydrogenation of natural oil fatty acids; and (f) monohydric alcohols from the saponification of waxes, such as myricyl alcohol, cetyl alcohol, and ceryl alcohol. The alcohols of groups (e) and (f) have wax-like physical characteristics. All of the foregoing 6 groups of "ester waxes" may, alternatively, be defined as waxes of non-hydrocarbon nature selected from the group consisting of true waxes, wax-like esters, and wax-like alcohols.

The plasticizer employed in either the base coat or in the melt coat, or both, must be a solvent for the cellulose ether and should be compatible with the wax and preferably should reduce the viscosity of cellulose ether-wax compositions. It should ordinarily be colorless, odorless and non-toxic. When a plasticizer is present in the melt coat, its amount should preferably be kept as low as possible, consistent with good flexibility of films, since, in general, the moisture impedance of such a coating is decreased as the amount of plasticizer increases.

The term "mineral wax" is herein employed in its customary meaning to designate hydrocarbon waxes such as paraffin, ceresin, or ozokerite and for the present purpose this wax should preferably have a melting point above 40° C.

The non-oxidizing, non-setting resins employed, although optional components, are preferably included in the melt to impart heat sealing properties thereto. Since the melt coating may have a thickness as low as 0.2 mil, or less, the amount of waxy materials is usually insufficient to provide a permanent seal between two fibrous sheets. The resins which may be employed should not become insoluble in the melt when the latter is held at temperatures of 90° to 150° C. during the coating operation. Examples of suitable types of resins include dewaxed dammar gum, ester gum, rosin, slow-setting or non-setting alkyds, modified alkyds, oil-soluble phenol formaldehyde resins, and modification products of the latter. Any resins which fall into one of these classes or a mixture of two or more of them which is compatible with the other ingredients of the melt may be used in the present compositions, but it is preferred to employ soft resins as they will form more flexible coatings. Specific examples of resins which may be used are: "Beckacite 2000," said to be an oil-reactive non-foaming, pure phenol-aldehyde resin; Lewisol 2L, Amberol 800 and Paranol 100, all believed to be natural resin-modified maleic-glycerol alkyds; and "Ester Gums" Nos. 5 and 6, which are esterified rosins having acid numbers generally in the range from 4 to 6, and softening points in the range from 80° to 95° C.; and the like.

The following examples illustrate the practice of the invention:

*Example 1*

In a preferred method of preparing the new articles, a solution of standard ethyl cellulose was made up to contain 75 parts of ethyl cellulose and 25 parts of mono-phenyl-di-ortho-xenyl phosphate, dissolved to form a 35 per cent solution in a solvent consisting of 75 parts of toluene and 25 parts of ethanol by volume. The solution had a viscosity of about 400 seconds by the falling ball method. This solution was dropped from a hopper through a slot onto a continuously moving sheet of paper. A uniform thin coating of ethyl cellulose was thus applied to the paper. The film-coated paper, after having been substantially freed from volatile solvents, was treated with a thin film of a "hot melt" composition comprising 10 per cent of low viscosity ethyl cellulose, 10 per cent of dibutyl phthalate, 18 per cent of a maleic ester modified ester gum, 20 per cent of paraffin wax, 5 per cent of a ceresin wax, and 37 per cent of 12-hydroxy stearin. The melt composition had a viscosity of 520 centipoises at 220° F. When the melt was applied directly over the film-coated paper, the gloss of the paper was materially improved, the composite sheet showed no evidence of curling on long standing, and the product was capable of being sealed to other similar sheets by the application of heat and pressure. The coated sheet was both water-proof and moisture-proof, the latter expression referring to imperviousness to water vapor while the former relates to the resistance of the coated article to penetration by liquid water. When subjected to flexing tests the composite coated sheet material showed no cracking or checking, even on fold and crease lines. Melt-coated paper flex-cracked after relatively few double bends, and solvent-cast foil-coated paper, while withstanding the flex test, failed in other important requirements, including gloss, heat sealing qualities, optical depth, etc. The composite article of the invention exhibited all of the desired characteristics due, no doubt, in part at least to the interfacial fusion which may be presumed to have occurred between the solvent-cast base coat and the overcoat of the described melt composition.

The moisture-proofness of a paper sheet coated according to the method of the invention was compared with that of a like sheet of paper without any protective coating and with single coatings of the ethyl cellulose film and of the "hot melt" composition. The results of the test are given in the following table. The conditions of treatment were identical in each case, a sheet of the paper under test being exposed at 35° C. to a saturated atmosphere on one of its faces and a dry atmosphere on the other. Results are calculated on the basis of grams of moisture penetrating a square meter of paper in 24 hours.

| Sample number | Thickness of ethyl cellulose coating | Thickness of hot melt coating | Moisture permeability |
|---|---|---|---|
| | Inches | Inches | |
| 1 | 0 | 0 | 1150 |
| 2 | 0.0007 | 0 | 800 |
| 3 | 0 | 0.0002 | 60 |
| 4 | 0.0008 | 0.00017 | 25 |

The unexpected increase in moisture resistance resulting from the combination of a "hot melt" top coating over a solvent-cast film coating upon paper is believed to result from the pore filling and sealing nature of the "hot melt" coating. When a "hot melt" coating is applied directly to a fibrous sheet, such as paper, the interlacing network of cellulose fibers, some of which stand erect, makes the coating somewhat discontinuous regardless of the care with which it is applied. When, however, these interlacing fibers are cemented into position by means of a solvent-cast film of ethyl cellulose, for example, none of the fibers are in position to rupture a subsequently applied "hot melt" coating, a flexible surface is provided, and the hot melt coat will not crack. Regardless of the theory, the results obtained indicate that the composite coating described above is more flexible, moisture-proof and has a higher gloss and greater apparent optical depth than film-coated paper alone or melt-coated paper alone.

*Example 2*

A printed paper stock of about 35 pounds per ream for use as a soap wrapper was coated with a solvent-cast film of plasticized ethyl cellulose 0.5 mil thick, the solid constituents being 85 per cent of 60 centipoise type ethyl cellulose and 15 per cent of mono-phenyl-di-ortho-xenyl phosphate. A melt coating was applied over the ethyl cellulose base coat in thickness of about 0.3 mil, the said melt consisting of 10 per cent of ethyl cellulose, 13 per cent of Beckacite 2000, 5 per cent of Staybellite (hydrogenated rosin), 28 per cent of paraffin wax, and 44 per cent of 12-hydroxy stearin. The finished article had a high gloss and hard abrasion resistant surface of high flexibility. The composite coating "set off" the printing to advantage and had the appearance of considerably greater depth than the actual coating thickness, being comparable in this regard with a foil wrapper of at least 1 mil in thickness and being far superior to such a wrapper in its moisture-resistance and other important characteristics. The moisture permeability of the coated paper was in the range of from 25 to 35 grams per square meter in 24 hours.

*Example 3*

Paper useful for wrapping foodstuffs such as flaked cereals or for making coffee bags and the like was coated with 0.5 mil of a solvent-cast film consisting of 60 per cent of ethyl cellulose, 15 per cent of mono-phenyl-di-ortho-xenyl phosphate, and 25 per cent of Santolite M. H. P. (a toluene sulfonamide-formaldehyde resin). The dried film coated paper was flexible but had too high a moisture transmission value and too low a gloss for the desired use. There was applied thereover a melt composition consisting of 10 per cent of ethyl cellulose, 18 per cent of Beckacite 2000, 28 per cent of paraffin, and 44 per cent of 12-hydroxy stearin, the melt being applied at a rate of from 4 to 5 pounds per ream of 3000 square feet. The total coating thickness was approximately 0.8 mil and the moisture transmission of the finished article, as well as its gloss, flexibility, and optical depth, were comparable with those set forth in the preceding examples.

It is observed that the base coat employed may be much thinner than the lowest practical thickness for free films of the type heretofore employed for wrapping purposes and, so long as this base coat is substantially continuous, there may be imparted to it the desired gloss and reduced moisture permeability by the application of extremely thin melt coatings, the total thickness of base film and melt overcoat being ordinarily no greater than the minimum thickness heretofore attainable in commercial production of free films for wrapping purposes.

The invention has been illustrated with reference to composite articles of paper, cellulose ether, and melt and printed paper, cellulose ether and melt coatings. The cellulose ether has in each case been ethyl cellulose. Other cellulose ethers of the water-insoluble type may be used, including propyl cellulose, methyl ethyl cellulose, ethyl lorol cellulose, and the like. The paper may be plain or printed and the cellulose ether film may be clear or colored plain or printed. Since cellulose ether films are printable with standard letter press inks, it is possible to prepare an article consisting of paper, film, printing on film, and melt overcoat. For offset effects, printing may appear on both the paper and the solvent-cast film stop coat.

The heat sealing properties of the two-layer coating comprising the ethyl cellulose film and the superimposed "hot melt" make possible the use of such an article as the wrapper for many food products, such as breadstuffs, cereals and the like, which must reach the market with a standard humidity content. The coated paper here described can be wrapped around a package of foodstuffs by the ordinary packaging machine and all joints sealed by the application to the joint of moderate pressure at a sealing temperature usually not exceeding 200° F. Products such as soap, tobacco, chewing gum, coffee and the like, which depend in part upon their fragrance and "fresh aroma" for popular acceptance, can thus be sealed to retain "factory freshness" even after long storage.

This application is a continuation-in-part of my co-pending application Serial No. 243,523, filed December 2, 1938.

I claim:

1. The method which comprises coating paper with a solvent-cast continuous film of a plasticized organic solvent soluble cellulose ether of thickness less than about 1 mil, and applying thereover a molten composition of thickness less than about 0.5 mil, from 60 to 100 per cent of which is a mixture consisting essentially of from 5 to 20 per cent of an organic solvent soluble lower alkyl ether of cellulose wherein the alkyl groups contain from 2 to 5 carbon atoms, from 25 to 80 per cent of a non-hydrocarbon wax selected from the group consisting of true waxes, wax-like esters, and wax-like alcohols, and from 5 to 30 per cent of a mineral wax; the remainder, not to exceed 40 per cent of the melt, consisting of a resin which is compatible in the melt and which remains soluble in the melt when the latter is heated to from 90° to 150° C. during coating operations in permissive amount up to 40 per cent, and a plasticizer for the cellulose ether which is compatible in the melt in permissive amount up to 20 per cent.

2. The method which comprises coating paper with a solvent-cast continuous film consisting essentially of about 75 parts of organic solvent soluble ethyl cellulose and 25 parts of mono-phenyl-di-ortho-xenyl phosphate, the said film having a thickness less than about 1 mil, and applying thereover a molten composition in thickness less than about 0.5 mil consisting essentially of 10 per cent of low viscosity organic solvent soluble ethyl cellulose, 10 per cent of dibutyl phthalate, 18 per cent of a maleic ester modified ester gum, 20 per cent of paraffin wax, 5 per cent of ceresin wax, and 37 per cent of 12-hydroxy-stearin.

3. The method which comprises coating paper with a solvent-cast continuous film of a plasticized organic solvent soluble ethyl cellulose of thickness less than about 1 mil, and applying thereover a molten composition of thickness less than about 0.5 mil consisting of 10 per cent of ethyl cellulose, 13 per cent of a phenolic resin which is compatible in the melt and which remains soluble therein when the latter is heated to from 90° to 150° C. during coating operations, 5 per cent of hydrogenated rosin, 28 per cent of a paraffin wax, and 44 per cent of 12-hydroxy-stearin.

4. The method as claimed in claim 1 wherein the coating operation is carried out on a printed paper.

5. As a new article of manufacture, paper bearing on one surface thereof a substantially continuous film of a plasticized organic solvent soluble cellulose ether of thickness less than 1 mil and thereover a coating of thickness less than about 0.5 mil of a composition, from 60 to 100 per cent of which is a mixture consisting essentially of from 5 to 20 per cent of an organic solvent soluble lower alkyl ether of cellulose wherein the alkyl groups contain from 2 to 5 carbon atoms, from 25 to 80 per cent of a non-hydrocarbon wax selected from the group consisting of true waxes, wax-like esters, and wax-like alcohols, and from 5 to 30 per cent of a mineral wax; the remainder, not to exceed 40 per cent of the composition, consisting of a compatible resin in permissive amount up to 40 per cent, and a compatible plasticizer for the cellulose ether in permissive amount up to 20 per cent, the said article being characterized by high gloss, by its moisture- and water-proofness, flexibility at service temperatures, heat sealing characteristics, and great apparent depth relative to actual coating thickness.

6. As a new article of manufacture, paper bearing on one surface thereof a substantially continuous film of a plasticized organic solvent soluble ethyl cellulose of thickness less than 1 mil, and thereover a coating of thickness less than about 0.5 mil of a composition, from 60 to 100 per cent of which is a mixture consisting essentially of from 5 to 20 per cent of organic solvent soluble ethyl cellulose, from 25 to 80 per cent of a non-hydrocarbon wax selected from the group consisting of true waxes, wax-like esters, and wax-like alcohols, and from 5 to 30 per cent of a mineral wax; the remainder, not to exceed 40 per cent of the composition, consisting of a compatible resin in permissive amount up to 40 per cent, and a compatible plasticizer for the ethyl cellulose in permissive amount up to 20 per cent, the said article being characterized by high gloss, by its moisture- and water-proofness, flexibility at service temperatures, heat sealing characteristics, and great apparent depth relative to coating thickness.

7. As a new article of manufacture, paper bearing on one surface thereof a substantially continuous film of a plasticized organic solvent soluble cellulose ether of thickness less than 0.5 mil and thereover a coating of thickness less than about 0.3 mil of a composition, from 60 to 100 per cent of which is a mixture consisting essentially of from 5 to 20 per cent of an organic solvent soluble lower alkyl ether of cellulose wherein the alkyl groups contain from 2 to 5 carbon atoms, from 25 to 80 per cent of a non-hydrocarbon wax selected from the group consisting of true waxes, wax-like esters, and wax-like alcohols, and from 5 to 30 per cent of a mineral wax; the remainder, not to exceed 40 per cent of the composition, consisting of a compatible resin in permissive amount up to 40 per cent, and a compatible plasticizer for the cellulose ether in permissive amount up to 20 per cent, the said article being characterized by high gloss, by its moisture- and water-proofness, flexibility at service temperatures, heat sealing characteristics, and great apparent depth relative to actual coating thickness.

8. As a new article of manufacture, paper bearing on one surface thereof a substantially continuous film of a plasticized organic solvent soluble ethyl cellulose of thickness less than 0.5 mil, and thereover a coating of thickness less than about 0.3 mil of a composition, from 60 to 100 per cent of which is a mixture consisting essentially of from 5 to 20 per cent of organic solvent soluble ethyl cellulose, from 25 to 80 per cent of a non-hydrocarbon wax selected from the group consisting of true waxes, wax-like esters, and wax-like alcohols, and from 5 to 30 per cent of a mineral wax; the remainder, not to exceed 40 per cent of the composition, consisting of a compatible resin in permissive amount up to 40 per cent, and a compatible plasticizer for the ethyl cellulose in permissive amount up to 20 per cent, the said article being characterized by high gloss, by its moisture- and water-proofness, flexibility at service temperatures, heat sealing characteristics, and great apparent depth relative to coating thickness.

9. As a new article of manufacture, paper bearing on one surface thereof a substantially continuous film of thickness less than 1 mil consisting of about 75 per cent of organic solvent soluble ethyl cellulose and 25 per cent of monophenyl-di-ortho-xenyl phosphate, and thereover a coating of thickness less than about 0.5 mil consisting of 10 per cent of low viscosity organic solvent soluble ethyl cellulose, 10 per cent of dibutyl phthalate, 18 per cent of a maleic ester modified ester gum, 20 per cent of paraffin wax, 5 per cent of ceresin wax, and 37 per cent of 12-hydroxy-stearin.

10. As a new article of manufacture, paper bearing on one surface thereof a substantially continuous film of a plasticized organic solvent soluble ethyl cellulose of thickness less than about 1 mil, and thereover a coating of thickness less than about 0.5 mil consisting of 10 per cent of organic solvent soluble ethyl cellulose, 13 per cent of a compatible, non-setting phenolic resin, 5 per cent of hydrogenated rosin, 28 per cent of paraffin wax, and 44 per cent of 12-hydroxystearin.

11. As a new article of manufacture, paper bearing the composite coating as claimed in claim 5 and printed indicia, the said printing being covered at least by the wax-bearing surface coating.

WILLIAM R. COLLINGS.